(12) United States Patent
Reece et al.

(10) Patent No.: US 11,271,233 B2
(45) Date of Patent: Mar. 8, 2022

(54) ELECTROLYTE BALANCING STRATEGIES FOR FLOW BATTERIES

(71) Applicant: Lockheed Martin Energy, LLC, Bethesda, MD (US)

(72) Inventors: Steven Y. Reece, Cambridge, MA (US); Paravastu Badrinarayanan, Cypress, TX (US); Nitin Tyagi, San Jose, CA (US); Timothy B. Grejtak, Boston, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 19 days.

(21) Appl. No.: 16/295,546

(22) Filed: Mar. 7, 2019

(65) Prior Publication Data

US 2019/0207236 A1   Jul. 4, 2019

Related U.S. Application Data

(62) Division of application No. 15/025,225, filed as application No. PCT/US2014/057129 on Sep. 24, 2014, now Pat. No. 10,249,897.

(Continued)

(51) Int. Cl.

| *H01M 8/06* | (2016.01) |
| *H01M 8/20* | (2006.01) |
| *H01M 8/1023* | (2016.01) |
| *H01M 8/1039* | (2016.01) |
| *H01M 8/1051* | (2016.01) |

(Continued)

(52) U.S. Cl.
CPC ....... *H01M 8/0693* (2013.01); *H01M 4/9016* (2013.01); *H01M 8/04238* (2013.01); *H01M 8/1023* (2013.01); *H01M 8/1039* (2013.01); *H01M 8/1051* (2013.01);

(Continued)

(58) Field of Classification Search
None
See application file for complete search history.

(56) References Cited

U.S. PATENT DOCUMENTS

| 4,159,366 A | 6/1979 | Thaller |
| 4,539,086 A | 9/1985 | Fujita et al. |

(Continued)

FOREIGN PATENT DOCUMENTS

| CA | 2658910 A | 1/2008 |
| EP | 0201925 A1 | 11/1986 |

(Continued)

OTHER PUBLICATIONS

Extended European Search Report from European Application No. 14857001.3, dated Apr. 26, 2017.

(Continued)

*Primary Examiner* — Carmen V Lyles-Irving
(74) *Attorney, Agent, or Firm* — BakerHostetler

(57) ABSTRACT

The present invention is directed to a redox flow battery comprising at least one electrochemical cell in fluid communication with a balancing cell, said balancing cell comprising: a first and second half-cell chamber, wherein the first half-cell chamber comprises a first electrode in contact with a first aqueous electrolyte of the redox flow battery; and wherein the second half-cell chamber comprises a second electrode comprising a catalyst for the generation of $O_2$; and wherein the second half-cell chamber does not contain an aqueous electrolyte.

20 Claims, 5 Drawing Sheets

Related U.S. Application Data

(60) Provisional application No. 61/882,324, filed on Sep. 25, 2013.

(51) Int. Cl.
*H01M 8/1053* (2016.01)
*H01M 8/18* (2006.01)
*H01M 4/90* (2006.01)
*H01M 8/04223* (2016.01)

(52) U.S. Cl.
CPC ......... *H01M 8/1053* (2013.01); *H01M 8/188* (2013.01); *H01M 8/20* (2013.01); *Y02E 60/50* (2013.01)

(56) References Cited

U.S. PATENT DOCUMENTS

| | | | |
|---|---|---|---|
| 5,026,465 | A | 6/1991 | Katz et al. |
| 5,258,241 | A | 11/1993 | Ledjeff et al. |
| 5,766,787 | A | 6/1998 | Watanabe et al. |
| 6,156,451 | A | 12/2000 | Banerjee et al. |
| 6,497,973 | B1 | 12/2002 | Amendola |
| 6,509,119 | B1 | 1/2003 | Kobayashi et al. |
| 7,179,561 | B2 | 2/2007 | Niu et al. |
| 2005/0084739 | A1 | 4/2005 | Swider-Lyons et al. |
| 2006/0019131 | A1 | 1/2006 | Akiyama et al. |
| 2011/0117411 | A1 | 5/2011 | Horne et al. |
| 2011/0244277 | A1 | 10/2011 | Gordon et al. |
| 2013/0084482 | A1 | 4/2013 | Chang et al. |
| 2013/0316199 | A1 | 11/2013 | Keshavarz et al. |
| 2014/0004402 | A1 | 1/2014 | Yan et al. |
| 2015/0017494 | A1 | 1/2015 | Amstutz et al. |
| 2016/0248109 | A1 | 8/2016 | Esswein et al. |
| 2016/0308234 | A1 | 10/2016 | Reece et al. |
| 2016/0308235 | A1 | 10/2016 | Reece |

FOREIGN PATENT DOCUMENTS

| | | |
|---|---|---|
| JP | H0821415 | 3/1996 |
| JP | 2000502832 A | 3/2000 |
| JP | 2007073428 A | 3/2007 |
| JP | 2010539919 A | 12/2010 |
| TW | 200713662 A | 4/2007 |
| WO | 9724774 A1 | 7/1997 |
| WO | 0215317 A1 | 2/2002 |
| WO | 2010138942 A2 | 12/2010 |
| WO | 2013090680 A2 | 6/2013 |
| WO | 2014120876 A1 | 8/2014 |
| WO | 2014142963 A1 | 9/2014 |
| WO | 2015048074 A1 | 4/2015 |
| WO | 2015173359 A1 | 11/2015 |
| WO | 2016168360 A1 | 10/2016 |

OTHER PUBLICATIONS

Hosseiny, et al., "A polyelectrolyte membrane-based vanadium/air redox flow battery," Electrochemistry Communications, 2010, pp. 751-754, 13.

International Search Report and Written Opinion for PCT/US2014/057129 dated Dec. 16, 2014.

International Search Report and Written Opinion from PCT/US2017/028191, dated Jul. 19, 2017, 12 paqes.

International Search Report and Written Opinion from PCT/US2017/030451, dated Jul. 5, 2017, 13 paqes.

Partial Supplementary European Search Report dated Feb. 9, 2017, which isued in European Aoolication No. 14847451.3.

Soloveichik, "Flow Batteries: Current Status and Trends," 2015, Chem. Rev., 115 (20), pp. 11533-11558.

Stassi, et aL, "Performance comparison of long and short-side chain perfluorosulfonic acid membranes for high temperature polymer electroiyte membrane fuel cell operation," Journal of Power Sources, 2011, pp. 8925-8930, 196.

Tseng et al., "A kinetic study of the platinum/carbon anode catalyst for vanadium redox flow battey," J Electrochemical Societ , 2013, pp. A690-A696, vol. 160.

Whitehead et al., "Investigation of a method to hinder charge imbalance in the vanadium redox flow battery," J Power Sources, 2012, pp. 271-276, vol. 230.

Office Action dated Nov. 19, 2021 for CN 201910721046.5.

ELECTROLYTE BALANCING STRATEGIES FOR FLOW BATTERIES

CROSS REFERENCE TO RELATED APPLICATIONS

This application is a divisional application of U.S. patent application Ser. No. 15/025,225, filed Mar. 25, 2016, which itself is a 35 U.S.C. § 371 National Stage entry of International Patent Application PCT/US2014/057129, filed Sep. 24, 2014, which claims the benefit of priority of U.S. Patent Application Ser. No. 61/882,324, filed Sep. 25, 2013, the contents of each of which are incorporated by reference in their entirety for any and all purposes.

TECHNICAL FIELD

The present invention relates to redox flow batteries and methods for operating the same.

BACKGROUND

Flow batteries are electrochemical energy storage systems in which electrochemical reactants, typically redox active compounds, are dissolved in liquid electrolytes, which are individually contained in negative electrolyte or negolyte and positive electrolyte or posolyte loops and circulated through reaction cells, where electrical energy is either converted to or extracted from chemical potential energy in the reactants by way of reduction and oxidation reactions. Optimal performance of the flow battery relies on the ability to maintain balance between the posolyte and negolyte, both in terms of pH and state of charge. Upon extended cycling, flow batteries typically develop an imbalance in both proton and electron content between the posolyte and negolyte due to the presence of parasitic electrochemical side reactions. One reaction is the evolution of hydrogen gas from water at the negative electrode, which results in an imbalance in both the electron (state-of-charge) and proton content between the posolyte and negolyte. This imbalance, if left uncorrected, subsequently results in a decrease in system performance. An imbalanced state may be corrected by processing either the posolyte, negolyte, or both in a balancing cell.

Various methods have been described for balancing flow battery electrolytes. These methods primarily address balancing the electron (state-of-charge) content between the posolyte and negolyte. No methods have been described that adequately address the simultaneous balancing of both the electron and proton contents of these electrolytes The present invention is aimed at addressing at least this deficiency.

SUMMARY

The present invention is directed to flow batteries, and methods of operating the same, said redox flow batteries comprising at least one electrochemical cell in fluid communication with at least one balancing cell, each balancing cell comprising:
a first and second half-cell chamber,
   wherein the first half-cell chamber comprises a first electrode in contact with a first aqueous electrolyte of the redox flow battery; and
   wherein the second half-cell chamber comprises a second electrode in contact with a second aqueous electrolyte, said second electrode comprising a catalyst for the generation of $O_2$. In some of these embodiments, the pH of the second electrolyte is at least 2. In other embodiments, there is no added second electrolyte.

In another embodiment, the flow battery balancing cell comprises a first half-cell chamber with a first electrode in contact with a first aqueous electrolyte of the redox flow battery; the second half-cell chamber comprises a second electrode in contact with a second aqueous electrolyte, said second electrode comprising a sacrificial carbon electrode material for the generation of $O_2$ and/or $CO_2$. The two half-cell chambers are separated by an ion exchange ionomer membrane.

In another embodiment, the flow battery balancing cell comprises a first half-cell chamber with a first electrode in contact with a first aqueous electrolyte of the redox flow battery; the second half-cell chamber comprises a second electrode comprising a catalyst for the generation of $O_2$ but said electrode is not in contact with a second aqueous electrolyte. The two half-cell chambers are separated by an ion exchange ionomer membrane.

In certain embodiments, the first aqueous electrolyte comprises a negative working electrolyte ("negolyte") of the redox flow battery. In other embodiments, the second aqueous electrolyte has a pH of at least 2 or higher. In still other embodiments, the balancing cell comprises composite, multiple, or bipolar membranes between the electrochemical cell and balancing cell.

BRIEF DESCRIPTION OF THE DRAWINGS

The present application is further understood when read in conjunction with the appended drawings. For the purpose of illustration, there are shown in the drawings exemplary embodiments of the subject matter; however, the presently disclosed subject matter is not limited to the specific methods, devices, and systems disclosed. In addition, the drawings are not necessarily drawn to scale. In the drawings.

DETAILED DESCRIPTION OF ILLUSTRATIVE EMBODIMENTS

Figure 1:
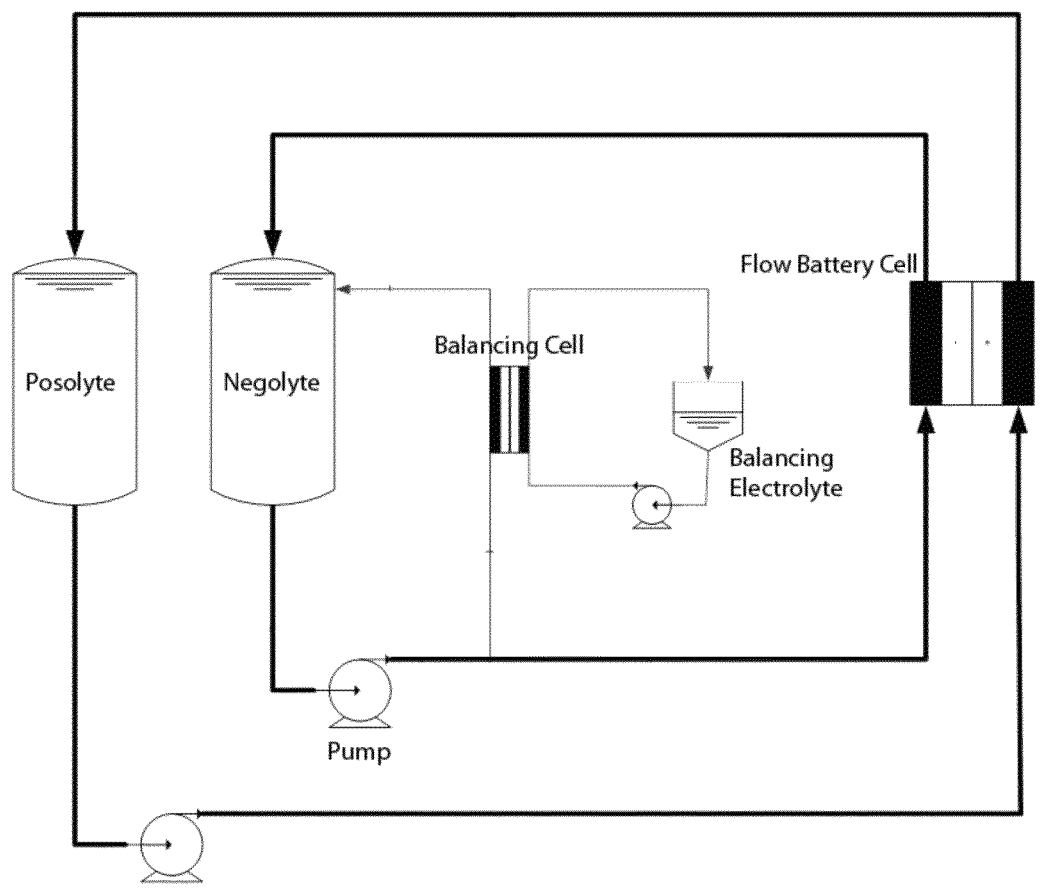
FIG. 1 provides a schematic of one embodiment of a flow battery of the present invention, including placement of the balancing cell in-line with the negolyte line of the flow battery.

The present invention relates to redox flow batteries and methods and apparatuses for monitoring the compositions of the electrolytes (posolyte or negolyte or both) therein. In particular, the present invention relates to methods and configurations for balancing the pH and state-of-charge of an electrolyte stream of a flow battery.

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to apparatuses and methods of using said apparatuses. That is, where the disclosure describes and/or claims a feature or embodiment associated with a system or apparatus or a method of making or using a system or apparatus, it is appreciated that such a description and/or claim is intended to extend these features or embodiment to embodiments in each of these contexts (i.e., system, apparatus, and methods of using).

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

In but one example of the divisibility of the embodiments, while this specification describes embodiments of the invention in terms of "A redox flow battery or other electrochemical device comprising at least one electrochemical cell in fluid communication with a balancing cell, said balancing cell comprising . . . " it should be apparent that the balancing cell provides its own stand-alone embodiments as described herein. That is, each description of the redox flow battery or other electrochemical device also includes those embodiments which may be described only in terms of the balancing cell.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

The present invention is directed to, inter alia, flow battery configurations where a balancing cell operates in fluid communication with an electrolyte, especially the negative electrolyte ("negolyte"), of a flow battery or other electrochemical device, so as to provide a device capable of correcting excursions of pH and state-of-charge within the electrolyte. It is desirable to configure and operate the balancing cell such that impurities are not introduced into the flow battery electrolytes. Particular impurities to be avoided are those which can accumulate onto the negative electrode of the flow battery, catalyze the evolution of $H_2$, and further catalyze the flow battery state-of-charge imbalance. In particular, it will be preferred to operate the balancing cell, wherein its positive electrode comprises an $O_2$ evolution catalyst that is highly resistant to corrosion and its negative electrode comprises current collector that is highly resistant to corrosion. Furthermore, it is desirable to prevent cross-over of active materials from the negolyte compartment into the second half-chamber, as such cross-over can deteriorate performance by either catalyst fouling or by formation of deposits inside the membrane leading to higher membrane resistance. Finally, it may be desirable to prevent large pH gradients across the membrane in the balancing cell. $O_2$ evolution is often performed under strongly acidic conditions, which may not be compatible with flow battery technologies in which the electrolytes are formulated with neutral or alkaline pH: the resulting pH gradient may eventually lead to pH equilibration, causing electrolytes in the main batteries to acidify. As such, it may be desirable to perform $O_2$ evolution at a pH value as similar as possible to the pH of electrolytes in the main battery, which may require careful selection of membrane and catalyst materials.

Accordingly, certain embodiments of the present invention provide redox flow batteries comprising at least one electrochemical cell in fluid communication with an electrochemical balancing cell, each cell comprising:
a first and second half-cell chamber,
  wherein the first half-cell chamber comprises a first electrode in contact with a first aqueous (working) electrolyte of the redox flow battery; and
  wherein the second half-cell chamber comprises a second electrode in contact with a second aqueous electrolyte, said second electrode comprising a catalyst for the generation of $O_2$.

In some of these embodiments, the pH of the second electrolyte is at least 2. In other embodiments, there is no added second electrolyte. Corresponding embodiments corresponding to the balancing cell alone are also within the scope of this disclosure.

In certain embodiments, the balancing cell may also be characterized as electrochemical rebalancing cell. See FIG. 1. In either case, the purpose of the balancing cell is to generate electrons and protons, for delivery to the working electrolyte via an appropriate ion exchange membrane, with the concomitant generation of oxygen. That is, the electrochemistry associated with the second half-cell of the balancing cell at acidic or neutral pH values may be described in terms of Equation (1):

$$2H_2O \rightarrow 2O_2 + 4H^+ + 4e^- \tag{1}$$

At more basic pH values, the electrochemistry associated with the second half-cell of the balancing cell may be described in terms of Equation (2):

$$4OH^- \rightarrow 2H_2O + O_2 + 4e^- \tag{2}$$

Figure 2:
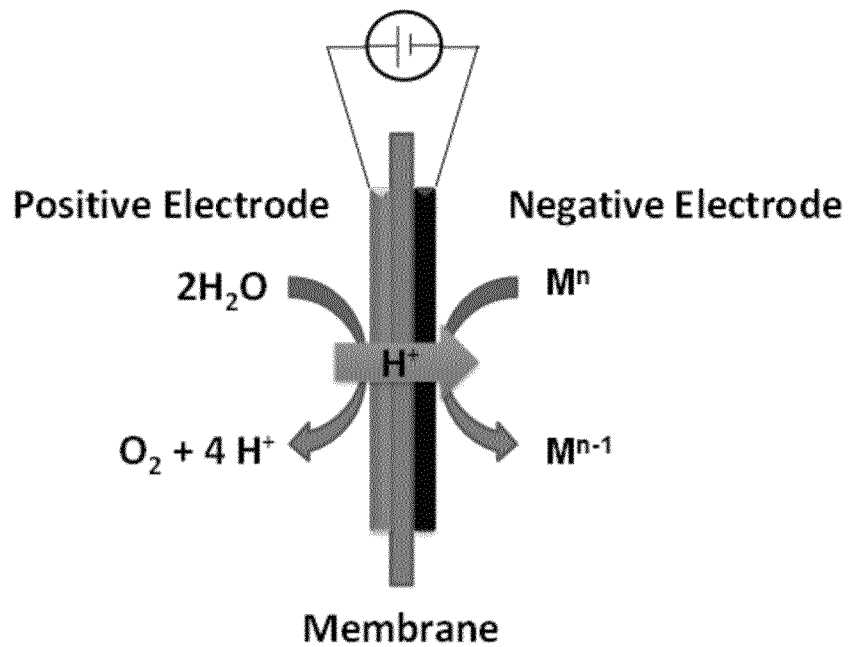
FIG. 2 provides a schematic of one embodiment of an electron balancing and pH correction cell of the present invention. $M^n$ may be the charged form of the positive electrolyte or the discharged form of the negative electrolyte in the flow battery.

The corresponding electrochemical reactions associated with the first half-cell of the pH correction may be described in Equation (3):

(3)

where $M^n$ and $M^{n-1}$ represent the redox active species in the negolyte. Note that the transport of protons through the membrane from the second to first half-cell of the pH correction cell provides a charge balance to the negolyte. See FIG. 2.

The balancing cell may be configured to be in fluid communication with either the positive or negative electrolytes of the flow battery, but in preferred embodiments, it is configured to be in fluid communication with the negative working electrolyte of the redox flow battery (i.e., the first aqueous electrolyte of the pH control cell is compositionally the same as the negolyte of the working flow battery). In such an arrangement, the balancing cell may directly correct any imbalance both the proton and electron inventories of the flow battery due to parasitic hydrogen evolution at the negative electrode of the main flow battery.

The membranes of the balancing cell should be those which preferentially conduct protons, to the virtual exclusion of other soluble materials. Alternatively, or additionally, the membranes may be matched with the redox active materials to as to further exclude the latter, for example by size, charge, equivalent weight, or chemical functionality. Suitable membranes may be composed of an ionomeric polymer. Such polymers may comprise perfluorosulphonic acid, (e.g. Nafion). Other membranes types are described herein.

In some embodiments, the second aqueous electrolyte may comprise an aqueous solution with a certain ionic strength, which may be selected so as to control the transport of water across the membrane of the balancing cell. The ionic strength of the second aqueous electrolyte may be tuned to influence the activity of water in the second aqueous electrolyte and, therein, control the osmotic flux of water across the membrane. It may be preferred for water to migrate from the second aqueous electrolyte to the negolyte or from the negolyte to the second aqueous electrolyte. The ionic strength may be selected such that the osmotic flux matches the rate at which water is consumed in the production of $O_2$. In some embodiments, the ionic strength of the second aqueous electrolyte may be selected to yield an osmotic flux that is essentially zero.

As described above, the second electrode comprises a catalyst for the generation of $O_2$. In certain of these embodiments, the second electrode comprises a metal oxide catalyst, said metal oxide catalyst being suitable for the electrochemical generation of $O_2$ from water. In addition to the ability to generate $O_2$, these oxidation catalysts preferably resist corrosion under the pHs considered in this application, are poor catalysts for the reduction of water to hydrogen, or both. Catalysts which corrode under the acidic or basic oxidizing conditions of the operating second aqueous electrolyte of the pH correction cell have the potential to cross-over to the first pH correction half-cell, interfering with either the intended effect of the pH correction cell or, worse, with the operation of the flow battery. If such cross-over catalysts are further efficient catalysts for the generation of hydrogen under the reducing conditions of the first half-cell, one can envision scenarios where the evolution of hydrogen in the first half-cell or at the negative electrode of the working flow battery causes safety concerns. Accordingly, the present invention contemplates the preferred use oxides of cobalt, iridium, iron, manganese, nickel, ruthenium, tin, or a combination thereof for use in the second electrode. Iridium oxide is especially preferred, because of its good catalytic activity toward $O_2$ evolution and its high corrosion resistance. In case the second half-chamber comprises an alkaline electrolyte, catalysts such as nickel oxide or nickel-iron oxide are especially preferred because of their good catalytic activity toward $O_2$ evolution and their high corrosion resistance in base.

In some embodiments, the first electrode of the balancing cell comprises carbon. Such electrodes are well known in the art and include graphitic carbon, glassy carbon, amorphous carbon, carbon doped with boron or nitrogen, diamond-like carbon, carbon onion, carbon nanotubes, carbon felt, carbon paper, and graphene. Carbon materials are capable of evolving $O_2$, albeit at rather high overpotentials, but it is inevitable that the carbon electrode itself will be oxidized into $CO_2$. As such, the carbon electrodes are semi-sacrificial of nature.

In some embodiments, the balancing cell is used to balance pH and SOC for a flow battery comprising metal-ligand coordination compounds as redox-active materials. Traditional flow batteries (e.g. all-Vanadium, iron-chrome, etc.) often operate under strongly acidic conditions, but flow batteries based on metal-ligand coordination compounds may operate under neutral or alkaline pH conditions. Each coordination compound exhibits optimal electrochemical reversibility, solubility, and chemical stability at a specific pH value, hence the optimal pH window of operation is different for each coordination compound-based flow battery, depending what active materials are being used. A number of different considerations have to be taken into account when designing a balancing cell aimed at balancing a coordination compound flow battery (CCFB) that operates at weakly acidic, neutral or alkaline pH.

First all, pH control is more important in CCFB's than in traditional, strongly acidic, flow batteries. The latter flow batteries typically operate in 1-5M strong acid (e.g. $H_2SO_4$, wherein the pH of the electrolytes is 1 or below), so that small imbalances in proton concentration will not significantly alter the pH of the main flow battery. In contrast, when a CCFB is operated at, for instance, pH 11, a relatively small build-up or depletion of protons may lead to significant pH changes, potentially affecting the battery performance by reduced electrochemical reversibility, solubility or chemical degradation of the coordination compounds.

Secondly, it may be preferred to avoid the use of strongly acidic electrolyte in the second half-chamber to prevent a large pH gradient across the membrane of the balancing cell. This is especially relevant for CCFB's that are operated at neutral or alkaline pH. The presence of large pH gradients may eventually lead to pH equilibration, effectively causing acidification of the electrolyte in the first half-chamber, which may be highly undesirable from the point of view of stable operation, as mentioned above. Hence, operation of the main battery at e.g. pH 11 may require the electrolyte in the second half-chamber of the balancing cell to be alkaline for long-term stable operation, impacting the selection of the water oxidation catalyst and the ionomer material for the membrane separator. In such circumstances it is necessary to operate any associated balancing cell at pH values more in line with those of the electrolytes. In certain embodiments of the present invention(s), then, the second aqueous electrolyte has a pH of at least 2. Other embodiments provide that the pH of this second aqueous electrolyte is in a range of from about 2 to about 3, from about 3 to about 4, from about 4 to about 5, from about 5 to about 6, from about 6 to about 7, from about 7 to about 8, from about 8 to about 9, from about 9 to about 10, from about 10 to about 11, from about 11 to about 12, from about 12 to about 13, from about 13 to about 14, or a combination of these ranges. Alternatively, the pH of the second aqueous electrolyte may be defined in terms of its difference from the working electrolyte that it is balancing (i.e., typically the negolyte). In such embodiments, this difference is less than about 8, less than about 7, less than about 6, less than about 5, less than about 4, less than about 3, less than about 2, or less than about 1 pH unit. In certain preferred embodiments, the working electrolyte has a pH in a range of from about 9 to about 13. Indeed, in many circumstances, the use of alkaline working electrolytes is preferred. In such embodiments, the pH of the second aqueous electrolyte may be in a range of from about 3, 4, 5, 6, 7, 8, or 9 to about 14, for example.

Thirdly, active material cross-over in the balancing may reduce long-term performance of the main battery. In case anionic coordination complexes are used in the main battery, these molecules may be transported from the first half-chamber of the balancing cell to the second half-chamber by means of migration. One side-effect of this unintended cross-over of anions is that, in order to fulfill charge balancing, fewer protons need to be transported from the second to the first half-chamber of the balancing cell, compromising the pH balancing function of the balancing cell. A second side effect of cross-over of coordination compounds is that these molecules may deposit within the membrane, increasing the membrane resistance. A third side-effect of cross-over of coordination compounds is that these molecules may be oxidized at the catalyst in the second half-chamber, and the oxidation products of this reaction may foul and/or deactivate the catalyst. Hence, prevention of cross-over of coordination compound active materials may be essential in certain embodiments.

Cross-over of active material may be minimized by intelligently selecting the configuration and/or composition of the separator material. Various membranes or membrane combinations may be selected for the balancing cell to address these potential issues. In some embodiments, standard membranes based on perfluorosulphonic acid or sulfonated polymers or co-polymers of tetrafluoroethylene, optionally comprising perfluorovinyl ethers may be used. Other exemplary perfluorinated membrane materials include copolymers of tetrafluoroethylene and one or more fluorinated, acid-functional co-monomers, which are commercially available as NAFION™ perfluorinated polymer electrolytes from E.I. du Pont de Nemours and Company, Wilmington Del. Other useful perfluorinated electrolytes comprise copolymers of tetrafluoroethylene (TFE) and $FSO_2$—$CF_2CF_2CF_2CF_2$—O—$CF=CF_2$.

In certain embodiments, however, membranes with a higher selectivity may be required. In some embodiments, it is helpful to precipitate metals, metal oxides, organometallic material, polymeric material, or a combination thereof. Such methods and materials are known in the art to improve membrane selectivity, for example by acting as a barrier for ions having large volumes (such as coordination compounds).

In other embodiments, a membrane specifically modified to suppress cross-over may be utilized. One attractive class of such membranes includes ionomer membranes, especially melt-extruded ionomer membranes based on the unique Short Side Chain (SSC) copolymer of Tetrafluoroethylene and a Sulfonyl Fluoride Vinyl Ether (SFVE) $F_2C=CF$—O—$CF_2CF_2$—$SO_2F$ of low molecular weight, commercially available as Aquivion™ PFSA. Aquivion™ membranes with low equivalent weight (980EW, 870EW, or lower) are especially preferred. These membranes, modified or as provided, can be used on their own, or it can be combined with more traditional membranes (e.g. N117, see Example 3).

In one other preferred embodiment, membranes that are typically used in the chlor-alkali industry may be applied. These membranes are bi-membranes consisting of one sulfonated and one carboxylated layer. In a chlorine-producing electrochemical cell, the carboxylated side of the membrane faces the negative half-chamber comprising a NaOH or KOH solution. The carboxylated membrane is highly effective at suppressing cross-over of anionic hydroxide ions from the negative to the positive half-chamber, which is a highly undesirable process during electrochemical chlorine production. It is expected that carboxylated membranes will also be effective at suppressing cross-over of anionic coordination complexes, given the much larger size of typical coordination complexes relative to $OH^-$ ions.

In certain embodiments, it may be desirable to avoid a pH gradient across the membrane of the balancing cell in order to prevent acidification of the electrolytes in the main battery. One approach to omitting pH gradients is to perform water oxidation under basic conditions (Equation 2, see above). In this scenario, charge balancing would have to be achieved by transport of hydroxide ions into the second half-chamber (as opposed to proton transport from the second to the first half-chamber when water oxidation is performed under acidic conditions). At the same time, protons still have to be injected into the first half-chamber to compensate for 'lost' protons due to $H_2$ evolution in the main battery. These requirements can be met by a bipolar membrane, which is a bi-membrane consisting of one cation exchange and one anion exchange ionomer membrane. Between these two layers, a metal oxide film is present that facilitates water dissociation. When a sufficiently high voltage is applied across this composite membrane, water is dissociated at the metal oxide layer, and as-generated protons migrate to the negative electrode whereas as-generated hydroxide ions migrate to the positive electrode. Using a bipolar membrane, the balancing cell can be operated while deploying a basic electrolyte in the second half-chamber (see Example 4). Besides the advantage of the absence of a significant pH gradient across the membrane in flow batteries that operate with basic electrolytes, additional advantages include the availability of more stable water oxidation catalysts (e.g. NiO, NiFeO, etc.) and an expected suppression of cross-over of active materials because of the presence of both anion and cation exchange ionomer material in the bipolar membrane.

In embodiments where the balancing cell is used to correct for $H_2$ evolution in the main flow battery, protons are transferred from the second half-chamber in the balancing cell to the first half chamber. In certain situations, especially when the balancing cell is operated at high current densities, the flux of protons into the electrolyte in the first half-chamber is high, potentially causing local pH drops in regions in the first half-chamber adjacent to the membrane. Local pH drops may result in local decomposition and/or precipitation of coordination compounds, potentially leading to obstruction of the flow field and/or cross-over the decomposition products (e.g. the dissociated ligand). In standard configurations of the balancing cell, the first half-chamber comprises a carbon paper electrode supported by plate made of a graphite/vinyl-ester composite material, in which an interdigitated flow field is machined. In this configuration, convective flow of electrolyte only occurs within the channels and close to ribs of the flow field. In contrast, in the region where most of the electrochemistry takes place (i.e. in the region adjacent to the membrane) there is no convective flow but active material and protons have to migrate in and out of that region by means of diffusion. Local pH drops due to proton injection may be prevented by configuring the first half-chamber in such a way that injected protons mix more effectively with the bulk electrolyte. Possible configurations include a non-conductive high-porosity medium (e.g. a polyester or polypropylene felt, porosity at least about 80% of total volume) that may be inserted between the membrane and the carbon paper or cloth (i.e., materials typically having lower porosities, e.g., on the order of about 70-80 volume %, based on the total volume of the material). Alternatively, the machined flow field in the plate can be omitted altogether by adopting an open flow field design where the electrolyte flows through a high-porosity electrode (e.g. a felt, or mesh, porosity at least 80 vol %). Both configurations should lead to more convective flow in regions adjacent to the membrane, potentially preventing local pH drops in the first half-chamber.

The balancing cell may be operated in a flow-through or batchwise arrangement. In preferred embodiments, at least the first half-cell chamber and optionally the second half-cell chamber is configured as a flow-through cell.

This disclosure also provides embodiments in which the second half-chamber of the balancing cell does not contain any aqueous electrolyte at all. In this configuration, the water required for the $O_2$ evolution reaction is provided by water from the aqueous electrolyte in the first half-chamber that is transported across the membrane. To avoid the situation of mass transport limitations, the water transport across the membrane needs to be faster than the consumption of water at the metal oxide catalyst. The membrane on the side of the second half-chamber is coated with a metal oxide $O_2$ evolution catalyst (e.g. $IrO_x$) as a result of which water that is transported from the first half-chamber across the membrane is directly oxidized into molecular oxygen and protons. This configuration may greatly simplify the design of the balancing cell. For instance, the metal oxide catalyst on the membrane can be directly interfaced with the titanium endplate, omitting the need for the titanium meshes that act as a flow field for the second aqueous electrolyte in examples 1-3. Furthermore, the balance of plant would be significantly simplified because the pump, tubing, and flow meters associated with the second half chamber can be omitted. The only additional design feature would be a vent for the molecular oxygen that is evolved at the metal oxide catalyst. Furthermore, water would have to be added periodically to the negolyte electrolyte tank to compensate for water that is consumed in the $O_2$ evolution reaction. Optionally, this make-up water can be produced in-situ by combining the evolved $O_2$ from the second half-chamber with the $H_2$ evolved in the second half-chamber of the balancing cell and in the negolyte compartment of the main cell. This water production process may be catalyzed by a noble metal catalyst (e.g. Pt, Pd, etc).

To this point, the invention has been described in terms of redox flow batteries in fluid communication with at least one electrochemical balancing cell. However, the invention also contemplates the operation of such cells. Accordingly, additional embodiments provide methods of operating any of the flow batteries described herein, each method comprising applying an electric potential across said first and second electrodes of the pH correction cell. In specific embodiments, the potential across these electrodes is maintained within about 500 mV of the overpotential voltage of the second aqueous electrolyte. In other independent embodiments, the potential across these electrodes is maintained within about 100 mV, about 250 mV, about 500 mV, or about 750 mV of the overpotential voltage of the second aqueous electrolyte.

In further embodiments, the balancing cell devices may be incorporated into electrochemical devices, including fuel cells and flow batteries, which themselves are incorporated into larger systems, for example, including cell stacks, storage tanks and pipings for containing and transporting the electrolytes, control hardware and software (which may include safety systems), and at least one power conditioning unit as part of an energy storage system. In such systems, the storage tanks contain the electroactive materials. The control software, hardware, and optional safety systems include all sensors, mitigation equipment and electronic/hardware controls and safeguards to ensure safe, autonomous, and efficient operation of the flow battery or other energy storage system.

Such storage systems may also include a power conditioning unit at the front end of the energy storage system to convert incoming and outgoing power to a voltage and current that is optimal for the energy storage system or the application. For the example of an energy storage system connected to an electrical grid, in a charging cycle the power conditioning unit would convert incoming AC electricity into DC electricity at an appropriate voltage and current for the electrochemical stack. In a discharging cycle the stack produces DC electrical power and the power conditioning unit converts to AC electrical power at the appropriate voltage and frequency for grid applications. Such energy storage systems of the present invention are well suited to sustained charge or discharge cycles of several hour durations. As such, the systems of the present invention are suited to smooth energy supply/demand profiles and provide a mechanism for stabilizing intermittent power generation assets (e.g. from renewable energy sources). It should be appreciated, then, that various embodiments of the present invention include those electrical energy storage applications where such long charge or discharge durations are valuable. For example, non-limiting examples of such applications include those where systems of the present invention are connected to an electrical grid include renewables integration, peak load shifting, grid firming, baseload power generation/consumption, energy arbitrage, transmission and distribution asset deferral, weak grid support, and/or frequency regulation. Additionally the devices or systems of the present invention can be used to provide stable power for applications that are not connected to a grid, or a micro-grid, for example as power sources for remote camps, forward operating bases, off-grid telecommunications, or remote sensors.

Terms

Throughout this specification, words are to be afforded their normal meaning, as would be understood by those skilled in the relevant art. However, so as to avoid misunderstanding, the meanings of certain terms will be specifically defined or clarified.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

As used herein, the term "redox couple" is a term of the art generally recognized by the skilled electrochemist and refers to the oxidized (electron acceptor) and the reduced (electron donor) forms of the species of a given redox reaction. The pair $Fe(CN)_6^{3+}/Fe(CN)_6^{4+}$ is but one, non-limiting, example of a redox couple. Similarly, the term "redox active metal ion" is intended to connote that the metal undergoes a change in oxidation state under the conditions of use. As used herein, the term "redox couple" may refer to pairs of organic or inorganic materials. As described herein, inorganic materials may include "metal ligand coordination compounds" or simply "coordination compounds" which are also known to those skilled in the art of electrochemistry and inorganic chemistry. A (metal ligand) coordination compound may comprise a metal ion bonded to an atom or molecule. The bonded atom or molecule is referred to as a "ligand". In certain non-limiting embodiments, the ligand may comprise a molecule comprising C, H, N, and/or O atoms. In other words, the ligand may comprise an organic molecule. In some embodiments of the present inventions, the coordination compounds comprise at least one ligand that is not water, hydroxide, or a halide ($F^-$, $Cl^-$, $Br^-$, $I^-$), though the invention is not limited to these embodiments. Additional embodiments include those metal ligand coordination compounds described in U.S. patent application Ser. No. 13/948,497, filed Jul. 23, 2013, which is incorporated by reference herein in its entirety at least for its teaching of coordination compounds.

Unless otherwise specified, the term "aqueous" refers to a solvent system comprising at least about 98% by weight of water, relative to total weight of the solvent. In some applications, soluble, miscible, or partially miscible (emulsified with surfactants or otherwise) co-solvents may also be usefully present which, for example, extend the range of water's liquidity (e.g., alcohols/glycols). When specified, additional independent embodiments include those where the "aqueous" solvent system comprises at least about 55%, at least about 60 wt %, at least about 70 wt %, at least about 75 wt %, at least about 80%, at least about 85 wt %, at least about 90 wt %, at least about 95 wt %, or at least about 98 wt % water, relative to the total solvent. It some situations, the aqueous solvent may consist essentially of water, and be substantially free or entirely free of co-solvents or other species. The solvent system may be at least about 90 wt %, at least about 95 wt %, or at least about 98 wt % water, and, in some embodiments, be free of co-solvents or other species. Unless otherwise specified, the term "non-aqueous" refers to a solvent system comprising less than 10% by weight of water, generally comprising at least one organic solvent. Additional independent embodiments include those where the "non-aqueous" solvent system comprises less than 50%, less than 40 wt %, less than 30 wt %, less than 20 wt %, less than 10%, less than 5 wt %, or less than 2 wt % water, relative to the total solvent.

The term "aqueous electrolyte" is intended to connote solvent system comprising at least one material, whose conductivity is higher than the solvent system without the material. In addition to the redox active materials, an aqueous electrolyte may contain additional buffering agents, supporting electrolytes, viscosity modifiers, wetting agents, and the like.

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to the reversible hydrogen electrode.

In the present invention, the negative electrode associated with the first aqueous electrolyte of the balancing cell may comprise the same or different materials than the negative electrode of the operating flow batteries, although they share a common electrolyte. By contrast, the positive electrode associated with the second aqueous electrolyte of the balancing cell will almost certainly comprise different materials than the positive electrode of the operating flow battery; in this case, the positive electrolyte of the flow battery will almost certainly be compositionally different, and physically separated from, the second electrolyte of the balancing cell.

As used herein, an "ionomer," refers to a polymer comprising both electrically neutral and a fraction of ionized repeating units, wherein the ionized units are pendant and covalently bonded to the polymer backbone. The fraction of ionized units may range from about 1 mole percent to about 90 mole percent, but may be categorized according to their ionized unit content. For example, in certain cases, the content of ionized units are less than about 15 mole percent; in other cases, the ionic content is higher, typically greater than about 80 mole percent. In still other cases, the ionic content is defined by an intermediate range, for example in a range of about 15 to about 80 mole percent.

The terms "negolyte" and "posolyte," generally refer to the electrolytes associated with the negative electrode and positive electrodes, respectively. As used herein, however, the terms "negolyte" and "posolyte" are reserved for the respective electrolytes of the flow battery. As contemplated herein, the negative working electrolyte (negolyte) of the flow battery comprises a coordination compounds or metal-ligand coordination compounds. Metal ligand coordination compounds may comprise at least one "redox active metal ion," at least one "redox inert metal ion," or both. The term "redox active metal ion" is intended to connote that the metal undergoes a change in oxidation state under the conditions of use. In specific embodiments, the negolyte comprises a metal ligand coordination complex having a formula comprising $M(L1)_x(L2)_y(L3)_z^m$, where M is Al, Ca, Ce, Co, Cr, Fe, Mg, Mn, Mo, Si, Sn, Ti, V, W, Zn, or Zr;

L1, L2, and L3 are each independently ascorbate, a catecholate, citrate, a glycolate or polyol (including ligands derived from ethylene glycol, propylene glycol, or glycerol), gluconate, glycinate, α-hydroxyalkanoate (e.g., α-hydroxyacetate, or from glycolic acid), βhydroxyalkanoate, γ-hydroxyalkanoate, malate, maleate, a phthalate, a pyrogallate, sarcosinate, salicylate, or lactate;

x, y, and z are independently 0, 1, 2, or 3, and $1 \le x+y+z \le 3$;

and m is +1, 0, −1, −2, −3, −4, or −5.

Related and independent embodiments provide that (a) x=3, y=z=0; (b) x=2, y=1, z=0; (c) x=1, y=1, z=1; (d) x=2, y=1, z=0; (e) x=2, y=z=0; or (f) x=1, y=z=0. In individual preferred embodiments, M is Al, Cr, Fe, or Ti and x+y+z=3. In more preferred embodiments, the negolyte comprises a metal-ligand coordination compound of titanium.

As used herein, unless otherwise specified, the term "substantially reversible couples" refers to those redox pairs wherein the voltage difference between the anodic and cathodic peaks is less than about 0.3 V, as measured by cyclic voltammetry, using an ex-situ apparatus comprising a flat glassy carbon disc electrode and recording at 100 mV/s. However, additional embodiments provide that this term may also refer to those redox pairs wherein the voltage difference between the anodic and cathodic peaks is less than about 0.2 V, less than about 0.1 V, less than about 0.075 V, or less than about 0.059 V, under these same testing conditions. The term "quasi-reversible couple" refers to a redox pair where the corresponding voltage difference between the anodic and cathodic peaks is in a range of from 0.3 V to about 1 V. Other embodiments provide that "substantially reversible couples" are defined as having substantially invariant (less than 10% change) peak separation with respect to scan rate.

The term "stack" or "cell stack" or "electrochemical cell stack" refers to a collection of individual electrochemical cells that are in electrically connection. The cells may be electrically connected in series or in parallel. The cells may or may not be fluidly connected.

The term "state of charge" (SOC) is well understood by those skilled in the art of electrochemistry, energy storage, and batteries. The SOC is determined from the concentration ratio of reduced to oxidized species at an electrode ($X_{red}/X_{ox}$). For example, in the case of an individual half-cell, when $X_{red}=X_{ox}$ such that $X_{red}/X_{ox}=1$, the half-cell is at 50% SOC, and the half-cell potential equals the standard Nernstian value, $E^0$. When the concentration ratio at the electrode surface corresponds to $X_{red}/X_{ox}=0.25$ or $X_{red}/X_{ox}=0.75$, the half-cell is at 25% and 75% SOC respectively. The SOC for a full cell depends on the SOCs of the individual half-cells and in certain embodiments the SOC is the same for both positive and negative electrodes. Measurement of the cell potential for a battery at its open circuit potential, and using Equations 2 and 3 the ratio of $X_{red}/X_{ox}$ at each electrode can be determined, and therefore the SOC for the battery system.

ADDITIONAL ENUMERATED EMBODIMENTS

The following embodiments are intended to complement, rather than supplant, those embodiments already described.

Embodiment 1. A redox flow battery or other electrochemical device comprising at least one electrochemical cell in fluid communication with a balancing cell, said balancing cell comprising:
a first and second half-cell chamber separated by a membrane,
   wherein the first half-cell chamber comprises a first electrode in contact with a first aqueous electrolyte of the redox flow battery; and
   wherein the second half-cell chamber comprises a second electrode in contact with a second aqueous electrolyte, said second electrode comprising a catalyst for the generation of $O_2$.

Embodiment 2. A redox flow battery comprising at least one electrochemical cell in fluid communication with a balancing cell, said balancing cell comprising:
a first and second half-cell chamber separated by a membrane,
   wherein the first half-cell chamber comprises a first electrode in contact with a first aqueous electrolyte of the redox flow battery; and
   wherein the second half-cell chamber comprises a second electrode comprising a catalyst for the generation of $O_2$; and wherein
   the second half-cell chamber does not contain (is free of) an aqueous electrolyte.

Embodiment 3. A redox flow battery or other electrochemical device comprising at least one electrochemical cell in fluid communication with a balancing cell, said balancing cell comprising:
a first and second half-cell chamber separated by a membrane,
   wherein the first half-cell chamber comprises a first electrode in contact with a first aqueous electrolyte of the redox flow battery; and
   wherein the second half-cell chamber comprises a second electrode in contact with a second aqueous electrolyte, said second electrode comprising a catalyst for the generation of $O_2$; and wherein the membrane comprises:
   (1) a negatively charged ionomer, preferably a first and second type of a negatively charged ionomer, for example a sulfonated perfluorinated polymer or co-polymer;
   (2) a positively charged ionomer;
   (3) a bipolar membrane; or
   (4) a combination of (1) to (3).

Embodiment 4. A balancing cell comprising:
a first and second half-cell chamber separated by a membrane,
wherein the first half-cell chamber comprises a first electrode in contact with a first aqueous electrolyte of an electrochemical device; and
wherein the second half-cell chamber comprises a second electrode in contact with a second aqueous electrolyte, said second electrode comprising a catalyst for the generation of $O_2$.

Embodiment 5. A working balancing cell comprising:
a first and second half-cell chamber separated by a membrane,
wherein the first half-cell chamber comprises a first electrode in contact with a first aqueous electrolyte of an electrochemical device; and
wherein the second half-cell chamber is free of added aqueous electrolyte.

Embodiment 6. The flow battery of any one of Embodiments 1 to 3 or the balancing cell of Embodiment 4 or 5, wherein the second aqueous electrolyte has a pH of at least 2, preferably greater than about 7, more preferably in a range of about 9 to about 14.

Embodiment 7. The flow battery of any one of Embodiments 1 to 3, wherein the first aqueous electrolyte comprises a negative working electrolyte of the redox flow battery.

Embodiment 8. The flow battery or balancing cell of any one of Embodiments 1 to 7, wherein the first aqueous electrolyte has a pH in a range of from about 9 to about 14.

Embodiment 9. The flow battery of any one of Embodiments 1 to 8, wherein the first and second aqueous electrolytes each have a pH whose difference is less than about 8, 7, 6, 5, 4, 3, 2, or 1.

Embodiment 10. The flow battery or balancing cell of any one of Embodiments 1 to 9, further comprising a high porosity medium located near or adjacent to the membrane in the first chamber, the high porosity medium providing enhanced convection in that region, leading to neutralization of protons that are injected into the first half-chamber.

Embodiment 11. The flow battery or balancing cell of any one of Embodiments 1 to 10, wherein the membrane comprises a sulfonated perfluorinated polymer or co-polymer Embodiment 12. The flow battery or balancing cell of any one of Embodiments 1 to 11, wherein the membrane comprises a sulfonated perfluorinated polymer or co-polymer of tetrafluoroethylene, optionally comprising perfluorovinyl ether moieties.

Embodiment 13. The flow battery or balancing cell of any one of Embodiments 1 to 12, wherein the membrane comprises an ionomer membrane.

Embodiment 14. The flow battery or balancing cell of any one of Embodiments 1 to 13, wherein the membrane comprises an ionomer membrane characterized as a short side chain (SSC) copolymer of tetrafluoroethylene and a sulfonyl fluoride vinyl ether (SFVE) $F_2C=CF-O-CF_2CF_2-SO_2F$ of low molecular weight.

Embodiment 15. The flow battery or balancing cell of any one of Embodiments 1 to 14, wherein the membrane comprises an ionomer membrane characterized as a short side chain (SSC) copolymer of tetrafluoroethylene and a sulfonyl fluoride vinyl ether (SFVE) $F_2C=CF-O-CF_2CF_2-SO_2F$ of low molecular weight, in which the membrane is modified by precipitating particles therewithin, the particles comprising a metal, a metal oxide, an insoluble or poorly soluble metalloorganic material, a polymer, or a combination thereof.

Embodiment 16. The flow battery or balancing cell of any one of Embodiments 1 to 15, wherein the membrane comprises bipolar membrane.

Embodiment 17. The flow battery or balancing cell of any one of Embodiments 1 to 16, wherein the membrane comprises a bipolar membrane, the bipolar membrane comprising at least one cation exchange ionomer membrane and one anion exchange ionomer membrane.

Embodiment 18. The flow battery or balancing cell of any one of Embodiments 1 to 17, wherein the membrane comprises a bipolar membrane, the bipolar membrane comprising at least one cation exchange ionomer membrane and one anion exchange ionomer membrane and having a metal oxide film sandwiched therebetween, said metal oxide film capable of catalyzing the dissociation of water upon the application of an electric potentiaal thereto.

Embodiment 19. The flow battery or balancing cell of any one of Embodiments 1 to 18, wherein the second electrode comprises a catalyst suitable for the electrochemical generation of oxygen from water.

Embodiment 20. The flow battery or balancing cell of any one of Embodiments 1 to 19, wherein the second electrode comprises a metal oxide catalyst, said metal oxide catalyst suitable for the electrochemical generation of oxygen from water.

Embodiment 21. The flow battery or balancing cell of any one of Embodiments 1 to 20, wherein the second electrode comprises an oxide of cobalt, iridium, iron, manganese, nickel, ruthenium, indium, tin, or a combination thereof, the oxide being optionally doped with fluorine (e.g., fluorine-doped tin oxide).

Embodiment 22. The flow battery or balancing cell of any one of Embodiments 1 to 21, wherein the second electrode comprises an oxide of iridium or an oxide of nickel.

Embodiment 23. The flow battery or balancing cell of any one of Embodiments 1 to 19, wherein the second electrode comprises an allotrope of carbon, for example carbon black, diamond, glassy carbon, graphite, amorphous carbon, graphene, fullerenes, carbon nanotubes, or a combination thereof.

Embodiment 24. The flow battery of any one of Embodiments 7 to 23, as applied to flow batteries, wherein the negative working electrolyte of the flow battery comprises a compound comprising Al, Ca, Ce, Co, Cr, Fe, Mg, Mn, Mo, Si, Sn, Ti, V, W, Zn, or Zr.

Embodiment 25. The flow battery Embodiment 24, wherein the negative working electrolyte of the flow battery comprises a coordination compound of titanium.

Embodiment 26. The flow battery or balancing cell of any one of Embodiments 1 to 25, wherein at least the half-cell chamber and optionally the second half-cell chamber is configured as a flow-through cell.

Embodiment 27. A energy storage system comprising the flow battery or balancing cell of any one of Embodiments 1 to 26.

Embodiment 28. A method of operating a flow battery or balancing cell of any one of Embodiments 1 to 26 or a system of Embodiment 27, said method comprising applying an electric potential across said first and second electrodes.

Embodiment 29. The method of Embodiment 28, wherein the potential is maintained within 500 mV of the overpotential voltage of the second aqueous electrolyte.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

Example 1

Figure 3:
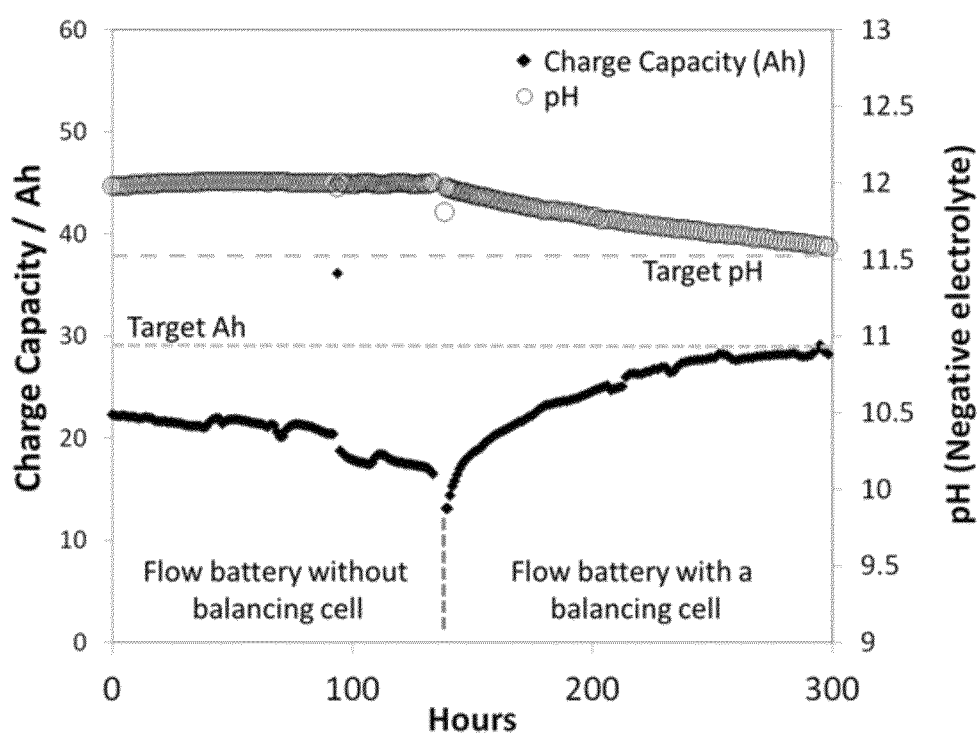
FIG. 3 provides data for flow battery cycle charge capacity and pH of negative electrolyte before and after initiation of the flow battery balancing cell. The vertical dashed line indicates the time at which the balancing cell is initiated (~125 hrs).

A balancing electrochemical cell was constructed with a Nafion™ 117 membrane (produced by E. I. du Pont de Nemours and Company, Wilmington, Del.), and an iridium oxide catalyst on the positive side with a metal oxide loading of not less than 1 mg/cm². The positive side of the membrane was supported with commercial titanium meshes (1.4 mm thick) and negative side was supported with a carbon paper (MGL 370, 350 microns thick), produced by Avcarb Material Products, Lowell, Mass. The carbon paper was supported by a flow field machined on commercially available graphite vinyl-ester composite. The active area of the cell was 25 cm², and the overall cell area was 64 cm². A flow rate of approximately 50 cc/min of de-ionized water was maintained on the positive side. A flow rate of approximately 200 cc/min of negative flow battery electrolyte was maintained on the negative side. The balancing cell was operated at a current density of about 25 mA/cm², and a cell voltage of about 2.7 V. FIG. 3 illustrates the cycling capacity in Amp-hours (Ah) and the pH of the negative electrolyte as a function of operating time with and without a balancing cell. The target Ah for the battery system was about 30 Ah and the target negative electrolyte pH was about 11.5. At the beginning of the experiment, the system exhibits a state-of-charge and pH imbalance as illustrated by the pH of ~12 and the low charge capacity of ~22 Ah. As the system is operated, the imbalance continues as pH of the negative electrolyte continues to rise and the charge capacity continues to fall. The imbalance is corrected through initiation of the balancing cell at ~125 hrs (vertical dashed line in FIG. 3); the pH is seen to decrease toward the target value of 11.5 and the charge capacity of the negative electrolyte recovers to the target 30 Ah.

Example 2

Figure 4A:
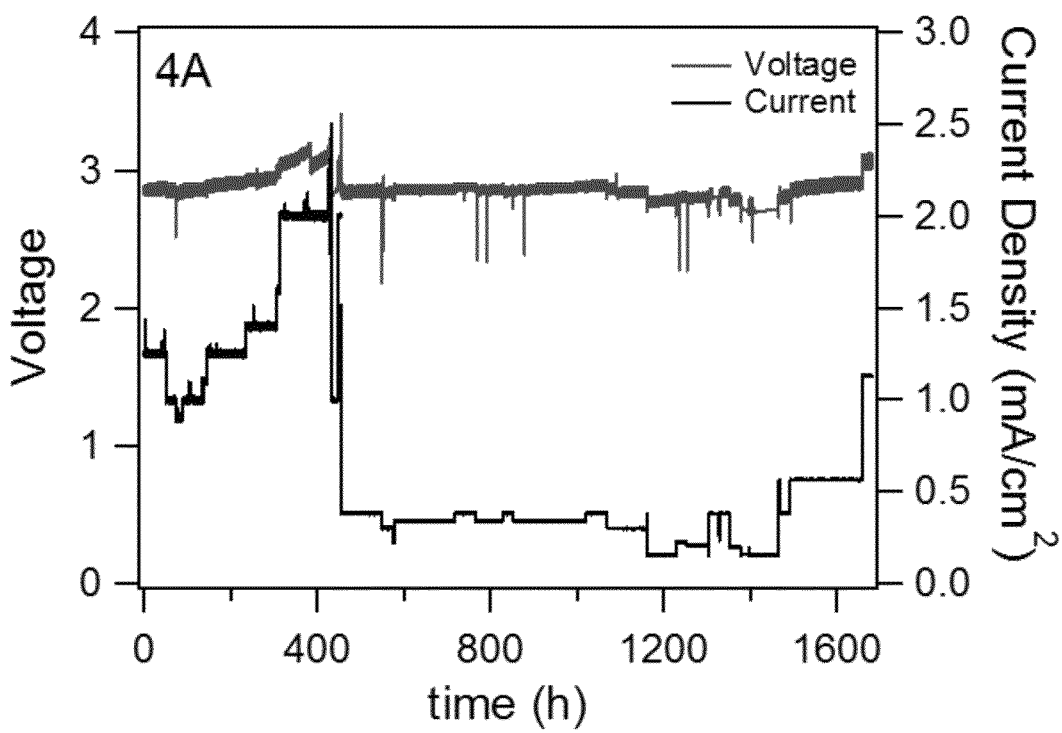
FIGS. 4A-B provide balancing cell data for voltage and current (FIG. 4A) and pH of negative electrolyte (FIG. 4B) for long-term operation of the balancing cell (>1600 h)
Figure 4B:
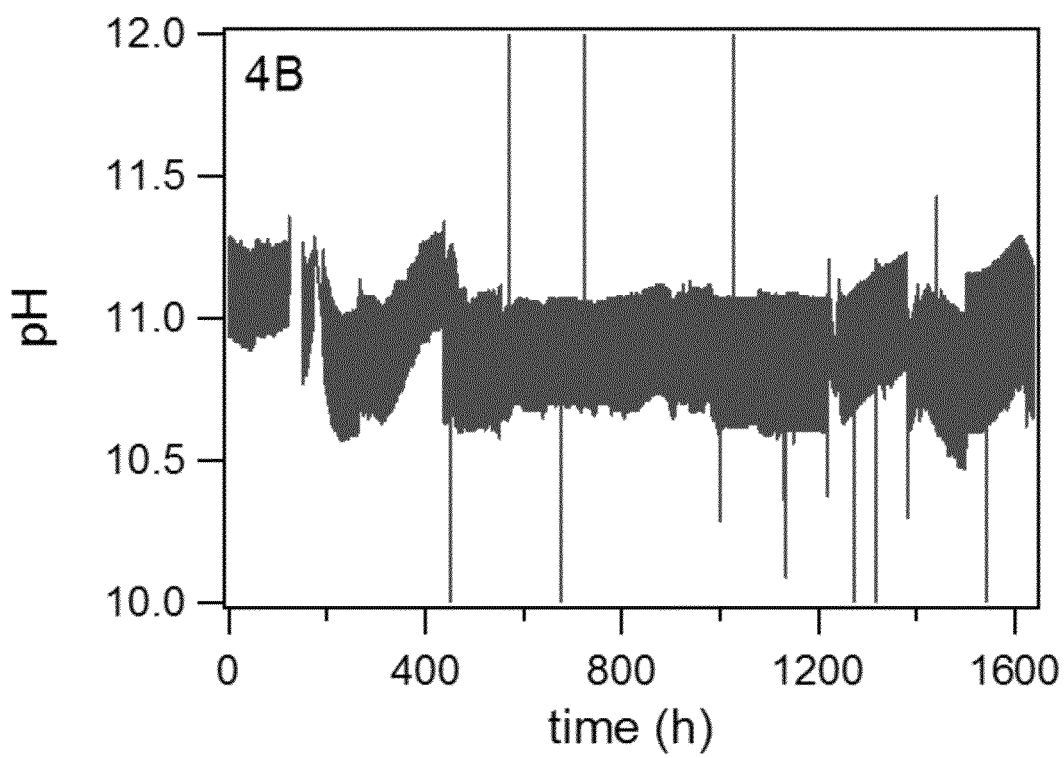

A balancing electrochemical cell was constructed with a Nafion™ 117 membrane (produced by E. I. du Pont de Nemours and Company, Wilmington, Del.), and an iridium oxide catalyst deposited on the positive side of the membrane with a metal oxide loading of not less than 1 mg/cm$^2$. The positive side of the membrane was supported with commercial titanium meshes (1.4 mm thick) and negative side was supported with a carbon paper (MGL 370, 350 microns thick), produced by Avcarb Material Products, Lowell, Mass. The carbon paper was supported by a flow field machined on commercially available graphite vinylester composite. The active area of the cell was 25 cm$^2$, and the overall cell area was 64 cm$^2$. A flow rate of approximately 50 cc/min of de-ionized water was maintained on the positive side. A flow rate of approximately 200 cc/min of negative flow battery electrolyte was maintained on the negative side. The balancing cell was operated in conjunction with a typical Coordination Compound Flow Battery (CCFB) as described in U.S. Patent US 2014/0028260 A1. In this example, the negolyte electrolyte material was circulated through both the flow battery and the balancing cell, hence pH and SOC control was directed at the ngative active material. FIG. 4A illustrates that in this particular example, the balancing cell operated at a stable voltage (~2.8V) for prolonged periods of time (>1600 h). Small fluctuations in the voltage of the balancing cell can be explained by higher set points of the current density, which is displayed as the bottom curve in FIG. 4A. As a result of even small amounts of H$_2$ evolution on the negative electrode of the main flow battery, operation of the flow battery for more than 1600 hr would inevitably lead to a pH increase of the negolyte electrolyte. FIG. 4B illustrates that the pH of the negolyte was kept relatively constant, which is a direct consequence of the pH control effected by the balancing cell.

Example 3

Figure 5:
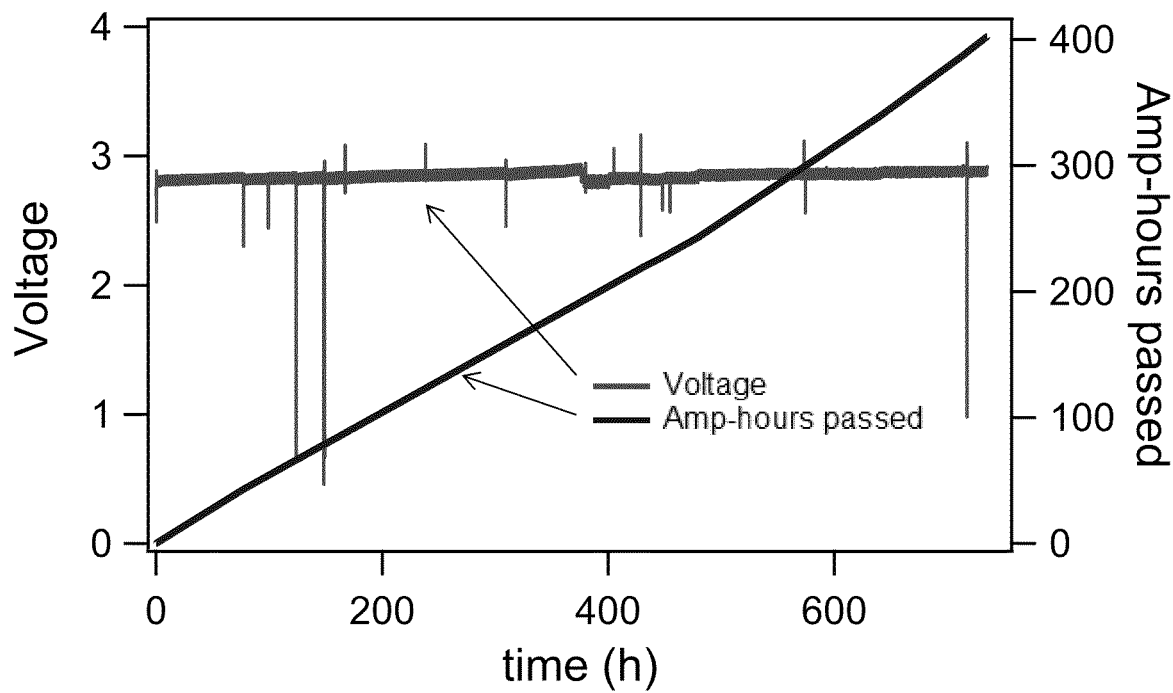
FIG. 5 provides voltage and Amp-hour data for a balancing cell that comprises a N117 membrane in combination with a modified Aquivion E87 membrane.

A balancing electrochemical cell was constructed with a Nafion™ 117 membrane (produced by E. I. du Pont de Nemours and Company, Wilmington, Del.), and an iridium oxide catalyst deposited on the positive side of the membrane with a metal oxide loading of not less than 1 mg/cm$^2$. The positive side of the membrane was supported with commercial titanium meshes (1.4 mm thick) and negative side was supported with a carbon paper (MGL 370, 350 microns thick), produced by Avcarb Material Products, Lowell, Mass. The carbon paper was supported by a flow field machined on commercially available graphite vinylester composite. Between the carbon paper negative electrode and the N117 membrane, an additional membrane was added to prevent cross-over of active species across the N117 membrane. This membrane consisted of a Solvay Aquivion® E87 membrane. The active area of the cell was 25 cm$^2$, and the overall cell area was 64 cm$^2$. A flow rate of approximately 50 cc/min of de-ionized water was maintained on the positive side. A flow rate of approximately 200 cc/min of negative flow battery electrolyte was maintained on the negative side. The balancing cell was operated in conjunction with a typical Coordination Compound Flow Battery (CCFB) as described in U.S. Patent US 2014/0028260 A1. In this example, the negolyte electrolyte material was circulated through both the flow battery and the balancing cell, hence pH and SOC control was directed at the negative active material. FIG. 5 shows that the as configured balancing cell is capable of balancing SOC and pH for hundreds of hours (current density: 10 mA/cm$^2$). The voltage of this cell is only minimally higher compared to balancing cells without the additional membrane. The slightly higher voltage observed (caused by the resistance of the added membrane) may be acceptable when suppression of active material cross-over is affected. During the duration of this test, no coloration of the DI water was observed, indicating that cross-over of active material is minimal.

Example 4

Figure 6:
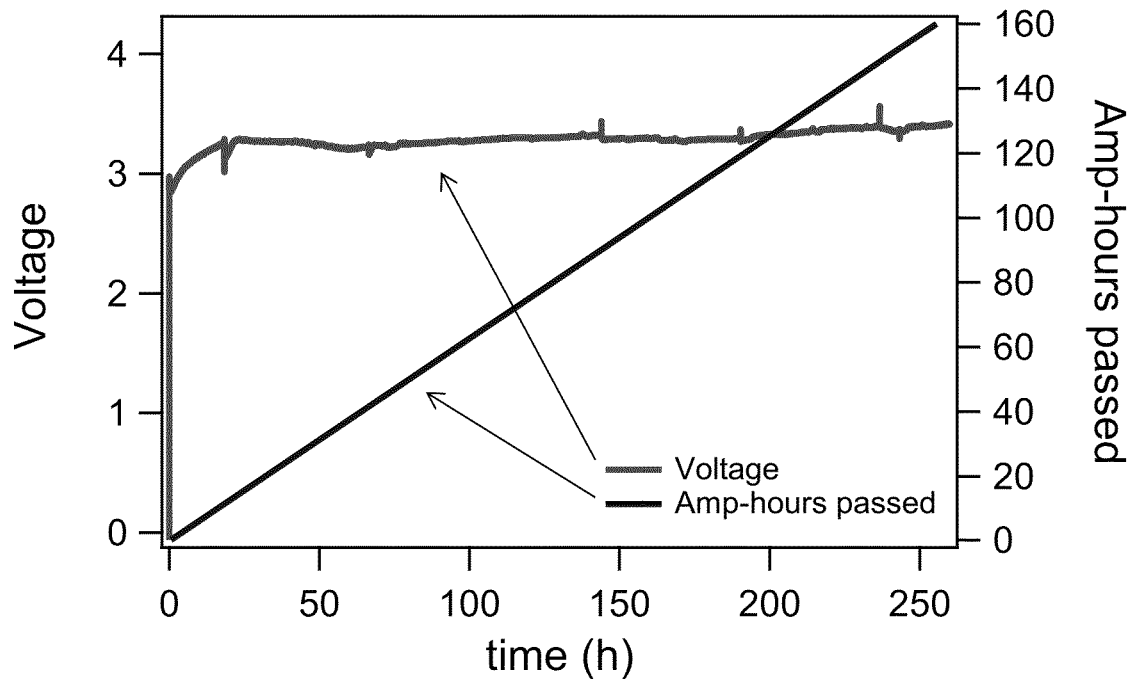
FIG. 6 provides voltage and Amp-hour data for a balancing cell that uses a bipolar membrane. In this balancing cell configuration, $O_2$ evolution is performed under alkaline conditions.

A balancing electrochemical cell was constructed with a Fumasep FBM bipolar membrane (produced by Fumatech GmbH, Germany). The positive side of the membrane was supported with commercial nickel meshes (1.4 mm thick) and the negative side was supported with a carbon paper (MGL 370, 350 microns thick), produced by Avcarb Material Products, Lowell, Mass. The carbon paper was supported by a flow field machined on commercially available graphite vinyl-ester composite. A flow rate of approximately 50 cc/min of 1M NaOH solution was maintained on the positive side. A flow rate of approximately 200 cc/min of negative flow battery electrolyte was maintained on the negative side. FIG. 6 shows the voltage-time data for this balancing cell for operation at 25 mA/cm$^2$. As can be seen in FIG. 6, the voltage required to sustain a 25 mA/cm$^2$ current density is higher (~3.3V) compared to the balancing cells that utilized a IrO$_x$ catalyst (~2.8V, FIGS. 4-5), which is a consequence of the higher membrane resistance of bipolar membranes. This increased voltage may be acceptable when a pH gradient across the membrane in the balancing cell is to be avoided and/or when cross-over of active material across the bipolar membrane is significantly lower compared to more traditional ionomer membranes.

Example 5

Figure 7:
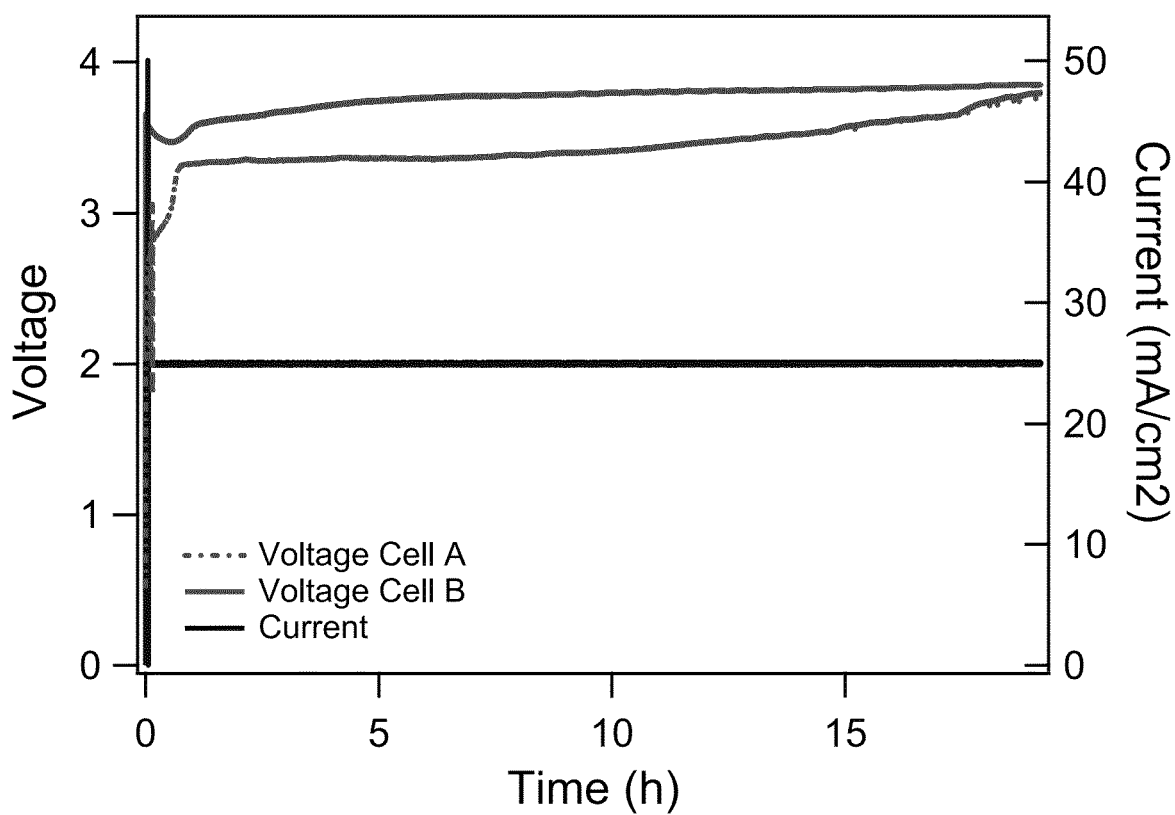
FIG. 7 provides voltage and current data for two balancing cells that use semi-sacrificial carbon electrodes in the second half-chamber. Cell A utilizes a carbon cloth electrode and Cell B utilizes a graphite felt electrode. In the Figure, Cell Voltage B is the top curve, Cell Voltage A is the middle curve, and Cell Current is ca. 25 mA/cm².

Two balancing electrochemical cells were constructed with carbonaceous materials as positive electrodes. Both cells were constructed with a Nafion™ 117 membrane (produced by E. I. du Pont de Nemours and Company, Wilmington, Del.). The first cell (cell A) utilized a BMC™ composite graphite plate in combination with an AvCarb™ 1071HCB carbon cloth (0.356 mm thickness) as positive electrode. The carbon cloth was supported by a flow field machined into the BMC™ composite material. The second cell (cell B) utilized an Eisenhuth® composite graphite plate in combination with a Morgan™ graphite felt (2.8 mm thickness) as the positive electrode. The negative side of the membrane comprised a carbon paper (Avcarb™ MGL 370, 0.35 mm thick), which was supported by a flow field machined into the BMC™ composite material. The active area of both cells was 25 cm$^2$, and the overall cell area was 64 cm$^2$. A flow rate of approximately 50 cc/min of de-ionized water was maintained on the positive side. A flow rate of approximately 200 cc/min of negative flow battery electrolyte was maintained on the negative side. The balancing cells were operated at a current density of 25 mA/cm$^2$, and exhibited cell voltages of about 3.3-3.7V. As can be seen in FIG. 7, the voltage required to sustain a 25 mA/cm$^2$ current density was significantly higher compared to the balancing cells that utilized a IrO$_x$ catalyst (FIGS. 4-5), clearly illustrating that catalyzing the water oxidation reaction results in balancing cells with lower voltages. For both cells A and B, the voltage required to drive 25 mA/cm² slowly increased over the timescale of ~15 h. Without intending to be bound by the correctness of any particular theory, it is believed that this voltage increase was due to the two electrochemical reactions occurring at the positive electrode, i.e. water oxidation and carbon oxidation. Hence, these carbon positive electrodes were truly sacrificial and needed to be replaced periodically. The advantage of this concept, however, is that no precious metal water oxidation catalyst was present in the balancing, reducing the risk corrosion and migration of these catalyst to the first half-chamber, where these metals would exacerbate $H_2$ evolution.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed:

1. A redox flow battery comprising at least one electrochemical cell in fluid communication with a balancing cell, said balancing cell comprising:
   a first and second half-cell chamber separated by a membrane,
   wherein the first half-cell chamber comprises a first electrode in contact with an aqueous electrolyte of the at least one electrochemical cell;
   wherein the second half-cell chamber comprises a second electrode, the second electrode abutting the membrane, and the second electrode comprising a catalyst for the generation of $O_2$;
   wherein the second half-cell chamber does not contain an added electrolyte;
   wherein the catalyst for the generation of $O_2$ is in fluid communication with water transported across the membrane from the aqueous electrolyte of the redox flow battery, and
   wherein the balancing cell is configured to maintain a state of charge of the aqueous electrolyte of the electrochemical cell, and
   wherein the aqueous electrolyte has a pH in a range of from 9 to 14.

2. The flow battery of claim 1, wherein the aqueous electrolyte comprises a negative working electrolyte of the redox flow battery.

3. The flow battery of claim 1, further comprising a porous medium located near or adjacent to the membrane in the first half-cell chamber.

4. The flow battery of claim 1, wherein the membrane comprises a sulfonated perfluorinated polymer or co-polymer.

5. The flow battery of claim 4, wherein the membrane comprises a sulfonated perfluorinated polymer or co-polymer of tetrafluoroethylene, optionally comprising perfluorovinyl ether.

6. The flow battery of claim 1, wherein the membrane comprises an ionomer membrane.

7. The flow battery of claim 6, wherein the ionomer membrane comprises a short side chain (SSC) copolymer of tetrafluoroethylene and a sulfonyl fluoride vinyl ether (SFVE) $F_2C=CF-O-CF_2CF_2-SO_2F$.

8. The flow battery of claim 7, wherein the ionomer membrane is modified by precipitating particles therewithin, the particles comprising a metal, metal oxide, organometallic, polymeric material, or a combination thereof.

9. The flow battery of claim 1, wherein the membrane comprises a bipolar membrane.

10. The flow battery of claim 9, wherein the bipolar membrane comprises at least one cation exchange ionomer membrane and one anion exchange ionomer membrane.

11. The flow battery of claim 10, wherein the bipolar membrane further comprises a metal oxide film sandwiched between the at least one cation exchange ionomer membrane and one anion exchange ionomer membrane, the metal oxide film being capable of catalyzing the dissociation of water upon the application of an electric potential thereto.

12. The flow battery of claim 1, wherein the second electrode comprises a catalyst suitable for the electrochemical generation of oxygen from water.

13. The flow battery of claim 12, wherein catalyst comprises a metal oxide.

14. The flow battery of claim 13, wherein the metal oxide comprises an oxide of cobalt, iridium, iron, manganese, nickel, ruthenium, indium, tin, or a combination thereof.

15. The flow battery of claim 14, wherein the second electrode comprises an oxide of iridium, an oxide of nickel, or an oxide of a nickel-iron alloy.

16. The flow battery of claim 12, wherein the catalyst comprises an allotrope of carbon.

17. The flow battery of claim 2, wherein the negative working electrolyte of the flow battery comprises a compound comprising Al, Ca, Ce, Co, Cr, Fe, Mg, Mn, Mo, Si, Sn, Ti, V, W, Zn, or Zr.

18. The flow battery of claim 17, wherein the negative working electrolyte of the flow battery comprises a coordination compound of titanium.

19. The flow battery of claim 1, wherein the first half-cell chamber is configured as a flow-through cell.

20. An energy storage system comprising the flow battery of claim 1.

* * * * *

UNITED STATES PATENT AND TRADEMARK OFFICE
CERTIFICATE OF CORRECTION

| | |
|---|---|
| PATENT NO. | : 11,271,233 B2 |
| APPLICATION NO. | : 16/295546 |
| DATED | : March 8, 2022 |
| INVENTOR(S) | : Steven Y. Reece et al. |

It is certified that error appears in the above-identified patent and that said Letters Patent is hereby corrected as shown below:

On the Title Page

In Other Publications, Item (56):

On Page 2, Under Column No. 2, Line no. 16, Replace:
"polymer electroiyte membrane"
With:
-- polymer electrolyte membrane --

On Page 2, Under Column No. 2, Line no. 19, Replace:
"flow battey," J Electrochemical Societ , 2013,"
With:
-- flow battery," J Electrochemical Society, 2013, --

Signed and Sealed this
Thirty-first Day of May, 2022

*Katherine Kelly Vidal*

Katherine Kelly Vidal
*Director of the United States Patent and Trademark Office*